(12) United States Patent
Rakib et al.

(10) Patent No.: US 9,819,519 B2
(45) Date of Patent: Nov. 14, 2017

(54) WIRELESS TELECOMMUNICATIONS SYSTEM FOR HIGH-MOBILITY APPLICATIONS

(71) Applicant: Cohere Technologies, Inc., Santa Clara, CA (US)

(72) Inventors: Shlomo Rakib, Saratoga, CA (US); Ron Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/410,578

(22) Filed: Jan. 19, 2017

(65) Prior Publication Data

US 2017/0288913 A1 Oct. 5, 2017

Related U.S. Application Data

(60) Provisional application No. 62/316,298, filed on Mar. 31, 2016, provisional application No. 62/316,243, filed on Mar. 31, 2016.

(51) Int. Cl.
| | |
|---|---|
| *H04B 17/00* | (2015.01) |
| *H04B 15/00* | (2006.01) |
| *H04L 25/03* | (2006.01) |
| *H04L 1/00* | (2006.01) |

(52) U.S. Cl.
CPC ...... *H04L 25/03006* (2013.01); *H04L 1/0018* (2013.01)

(58) Field of Classification Search
CPC ...... H04B 1/0475; H04L 1/0071; H04L 27/36
USPC .......... 455/63.1, 67.13, 501, 503, 504, 506; 375/260, 267, 295, 296
See application file for complete search history.

(56) References Cited

U.S. PATENT DOCUMENTS

| | | | | |
|---|---|---|---|---|
| 5,835,529 A | * | 11/1998 | Koga | ...................... H04B 1/713 375/275 |
| 6,055,415 A | * | 4/2000 | Suzuki | .................. H04W 52/08 455/522 |
| 6,381,234 B2 | * | 4/2002 | Sakoda | ................ H04B 7/2615 370/336 |
| 7,773,685 B2 | | 8/2010 | Tirkkonen et al. | |
| 7,864,877 B2 | | 1/2011 | Hottinen | |
| 8,619,892 B2 | | 12/2013 | Vetter et al. | |
| 9,479,381 B2 | * | 10/2016 | Siohan | .................. H04L 1/0668 |
| 2006/0008021 A1 | | 1/2006 | Bonnet | |
| 2007/0104283 A1 | | 5/2007 | Han et al. | |
| 2013/0058390 A1 | | 3/2013 | Haas et al. | |
| 2014/0169433 A1 | | 6/2014 | Hadani et al. | |
| 2014/0348252 A1 | | 11/2014 | Siohan et al. | |

(Continued)

OTHER PUBLICATIONS

R. Hadani et al., "Orthogonal Time Frequency Space Modulation," 2017 IEEE Wireless Communications and Networking Conference (WCNC), San Francisco, CA, USA, 2017, pp. 1-6.

(Continued)

*Primary Examiner* — Quochien B Vuong
(74) *Attorney, Agent, or Firm* — McGeary Cukor LLC; Jason Paul DeMont; Kenneth Ottesen

(57) ABSTRACT

A wireless telecommunications system that mitigates infra-symbol interference due to Doppler-shift and multipath. Embodiments of the present invention are particularly advantageous for wireless telecommunications systems that operate in high-mobility environments, including high-speed trains and airplanes.

20 Claims, 16 Drawing Sheets

(56) References Cited

U.S. PATENT DOCUMENTS

| | | |
|---|---|---|
| 2015/0080725 A1 | 3/2015 | Wegner |
| 2015/0117395 A1 | 4/2015 | Hadani et al. |
| 2016/0157146 A1 | 6/2016 | Karabinis |

OTHER PUBLICATIONS

Mazzaro et al., "Introduction to Stepped-Frequency Radar," US Army RDECOM, Aug. 2013, pp. 1-22 (accessible at http://ece.citadel.edu/mazzaro/particip/SFR_Intro_Mazzaro.pdf, last accessed May 22, 2017).

Examiner's Amendment and Reasons for Allowance, U.S. Appl. No. 15/215,007, dated May 30, 2017, pp. 12-15, in particular.

Examiner's Amendment and Reasons for Allowance, U.S. Appl. No. 15/146,987, dated Jan. 25, 2017, pp. 2-3.

International Search Report and the Written Opinion of the International Searching Authority, International Application No. PCT/US2017/025291, International Filing Date Mar. 31, 2017.

* cited by examiner

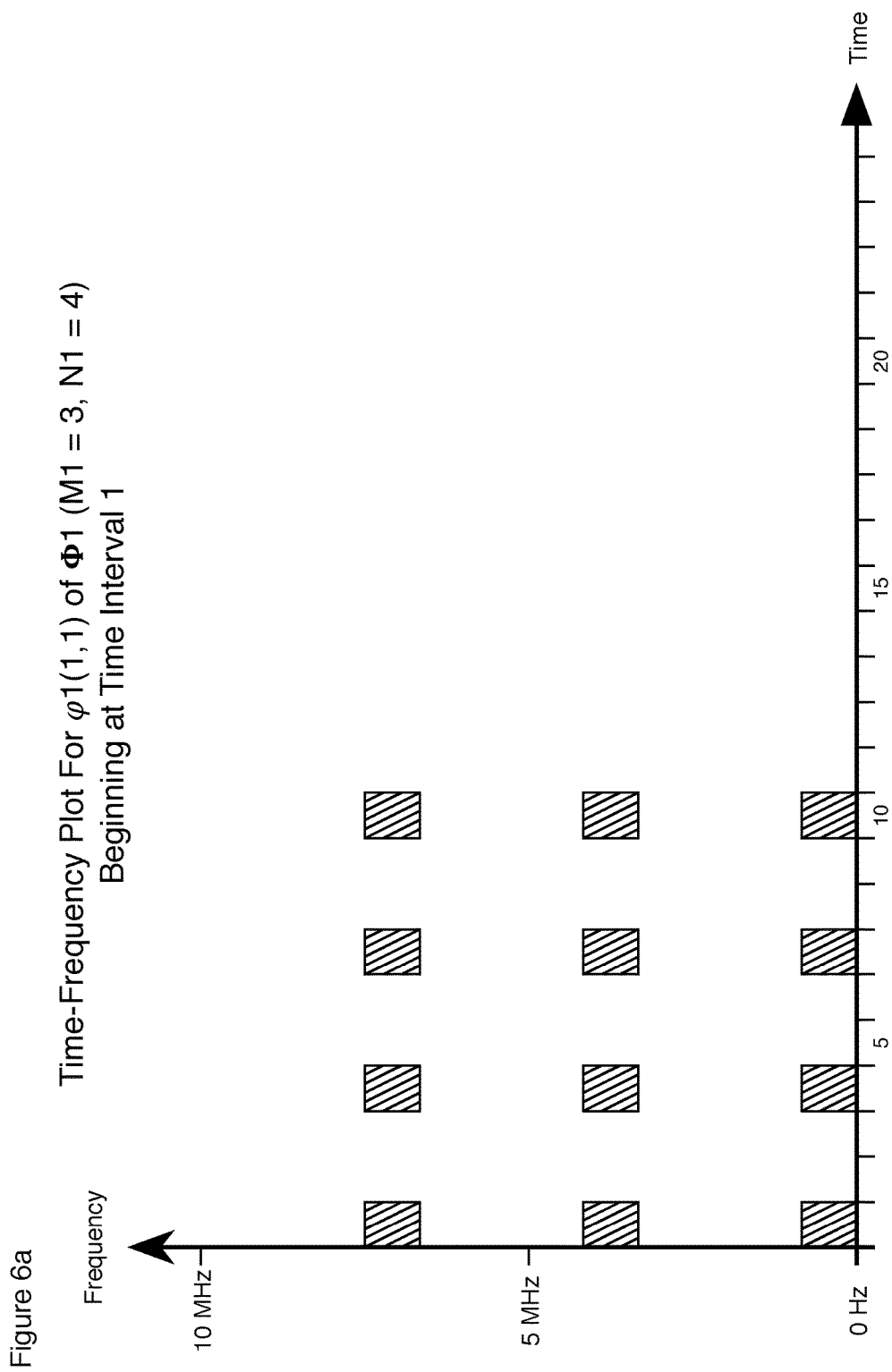

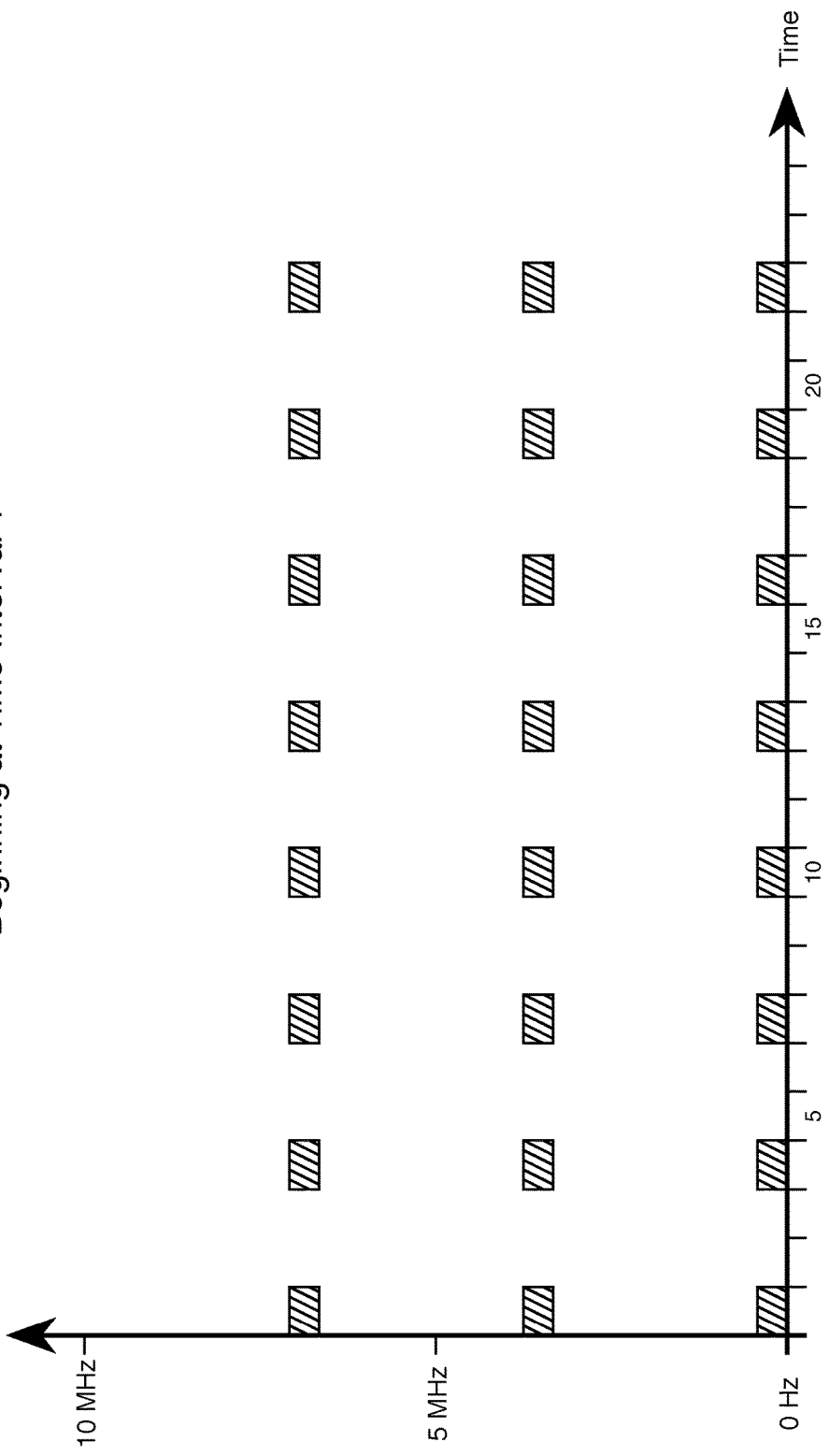

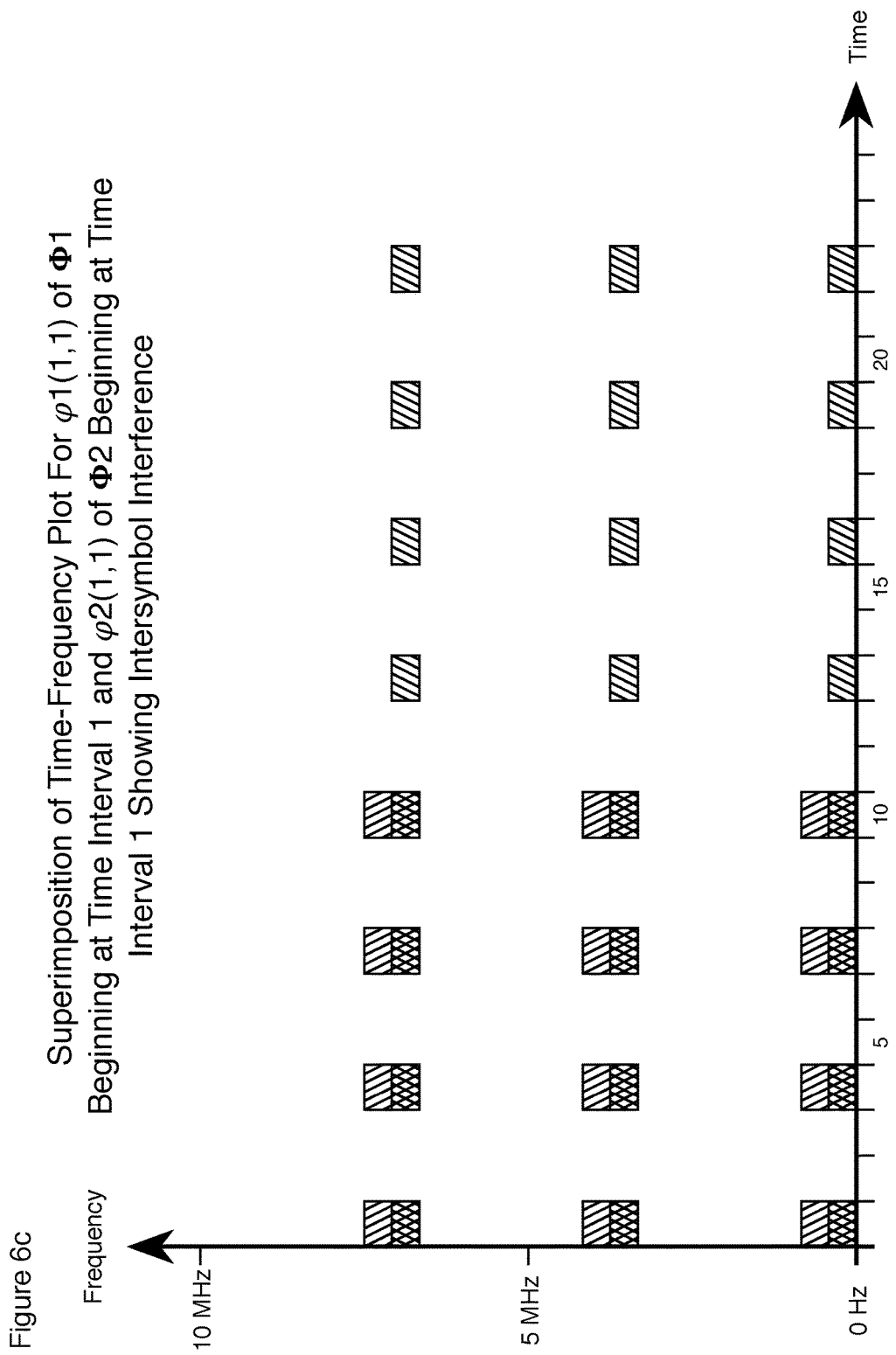

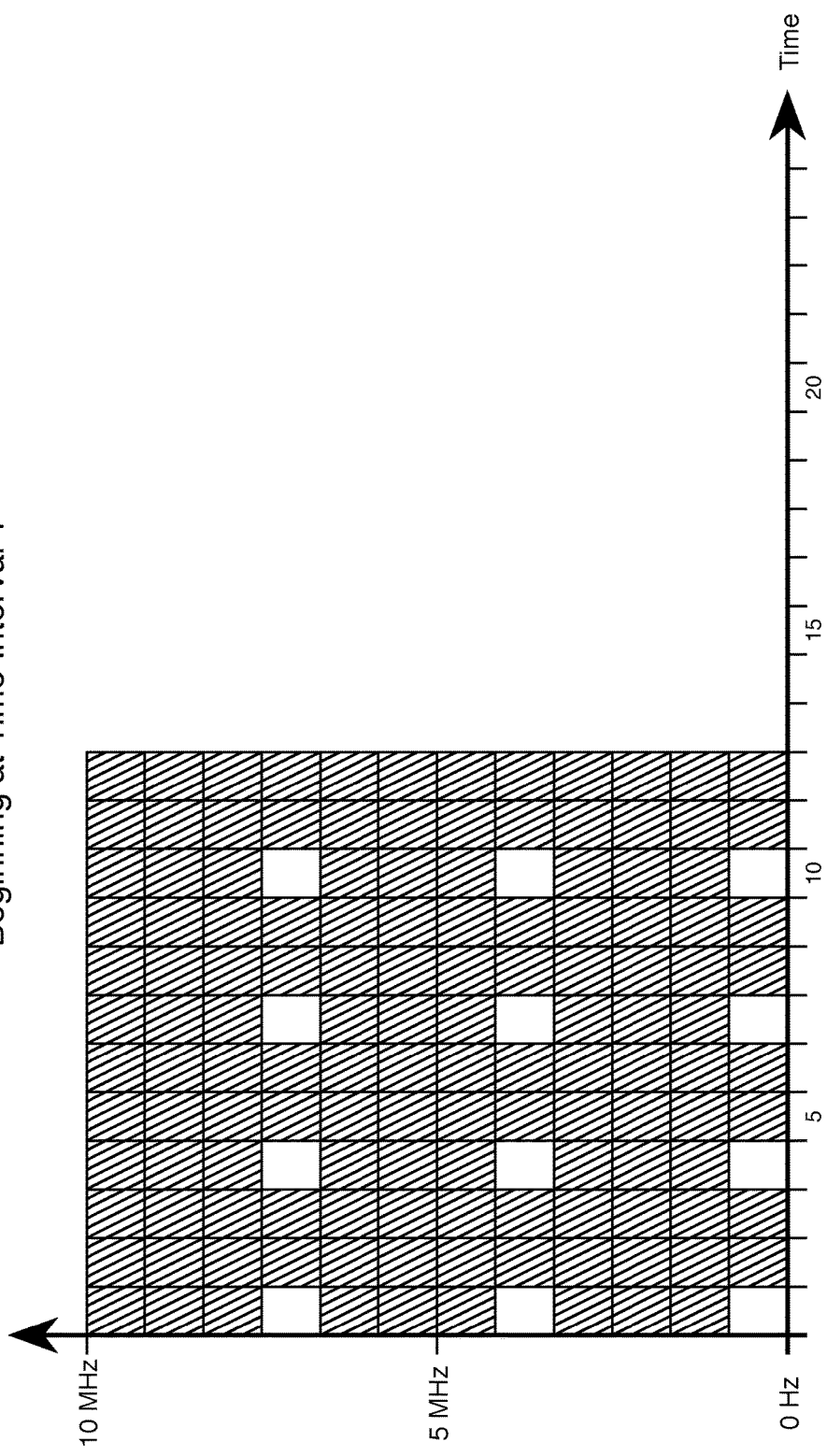

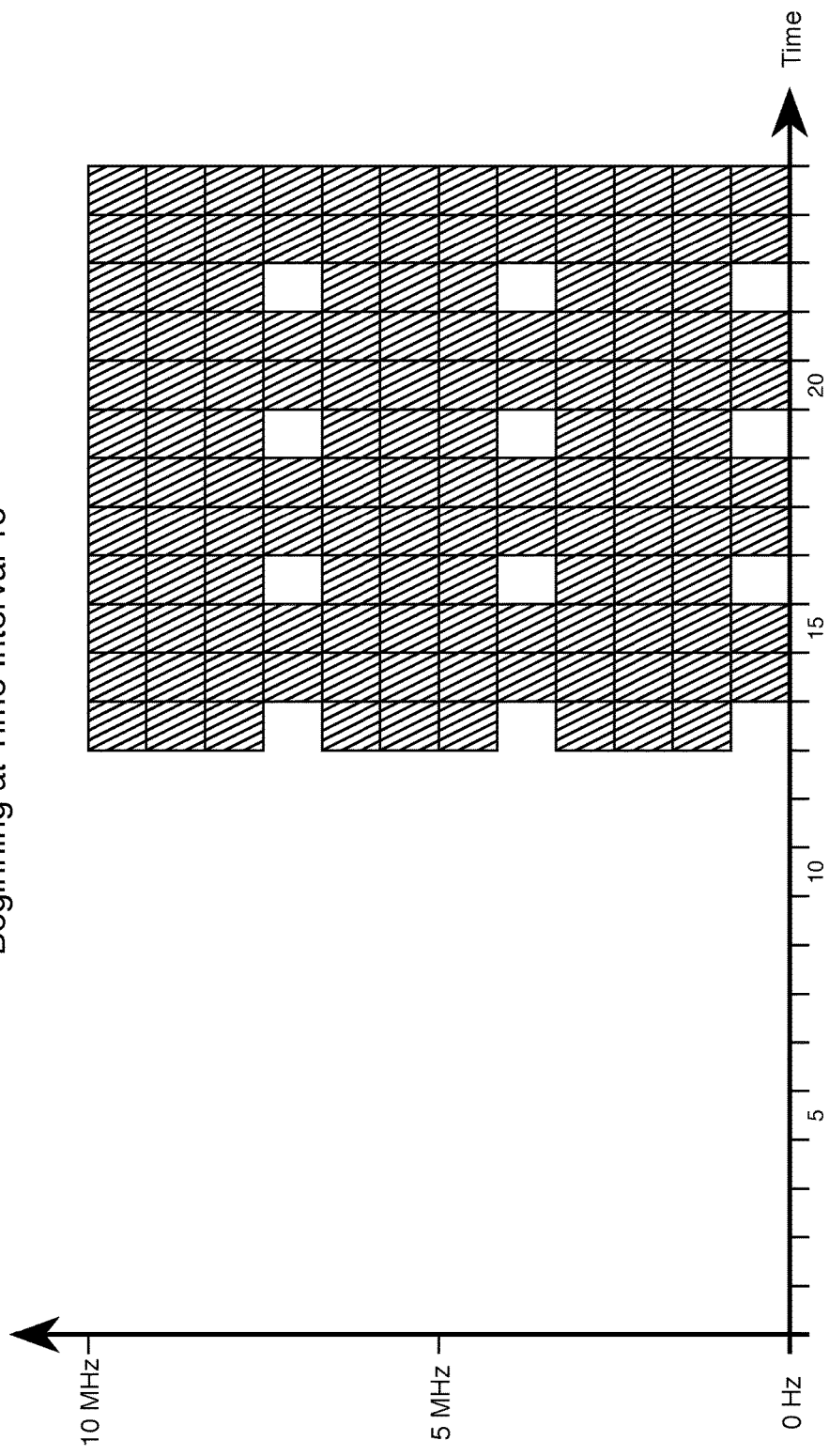

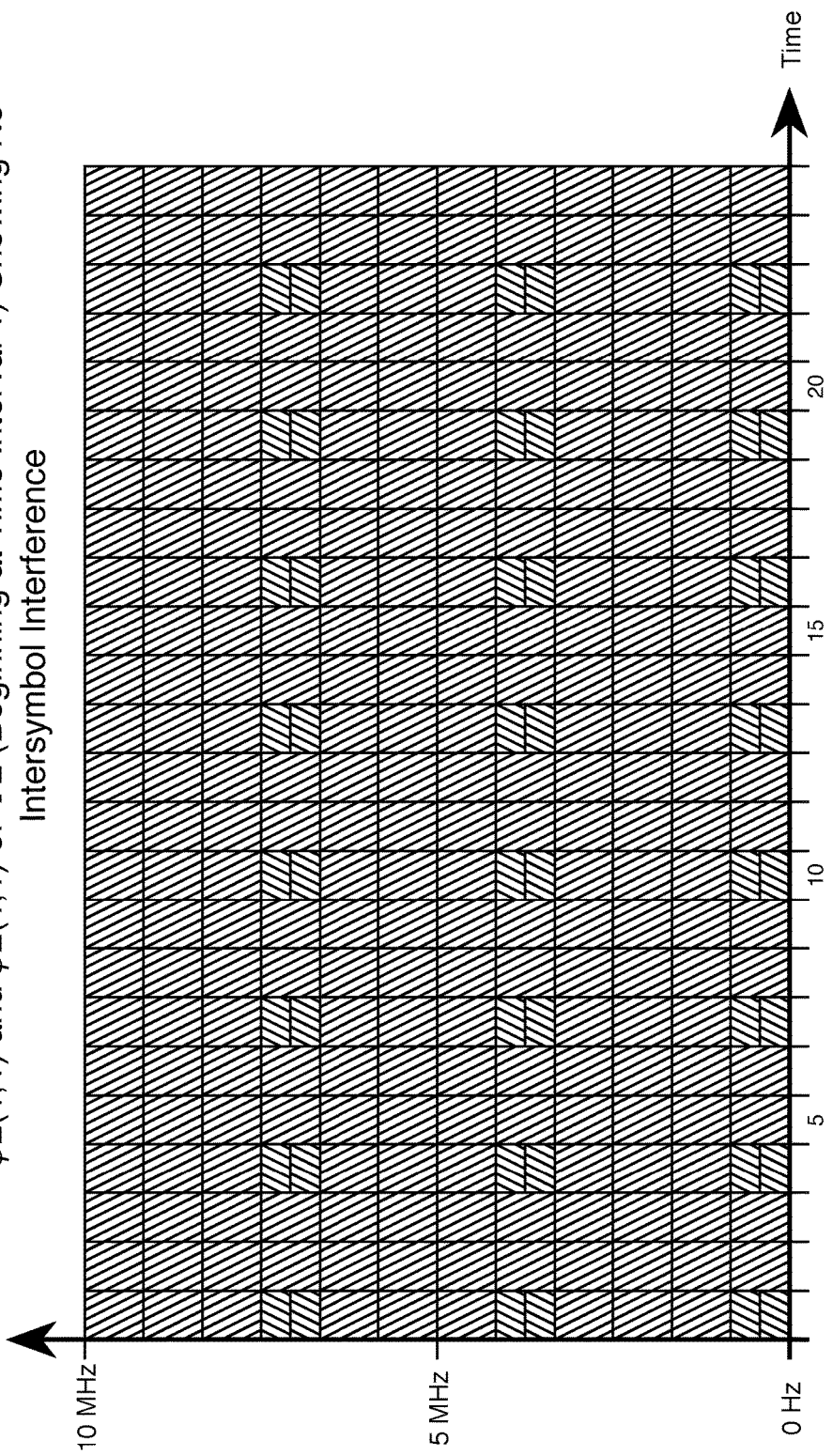
Figure 7d  Superimposition of Time-Frequency Plot For $\varphi1(m{\neq}1,n{\neq}1)$ of $\Phi1$ (Beginning at Time Interval 1), $\varphi1(m{\neq}1,n{\neq}1)$ of $\Phi1$ (Beginning at Time Interval 13), and $\varphi2(1,1)$ and $\varphi2(1,1)$ of $\Phi2$ (Beginning at Time Interval 1) Showing No Intersymbol Interference

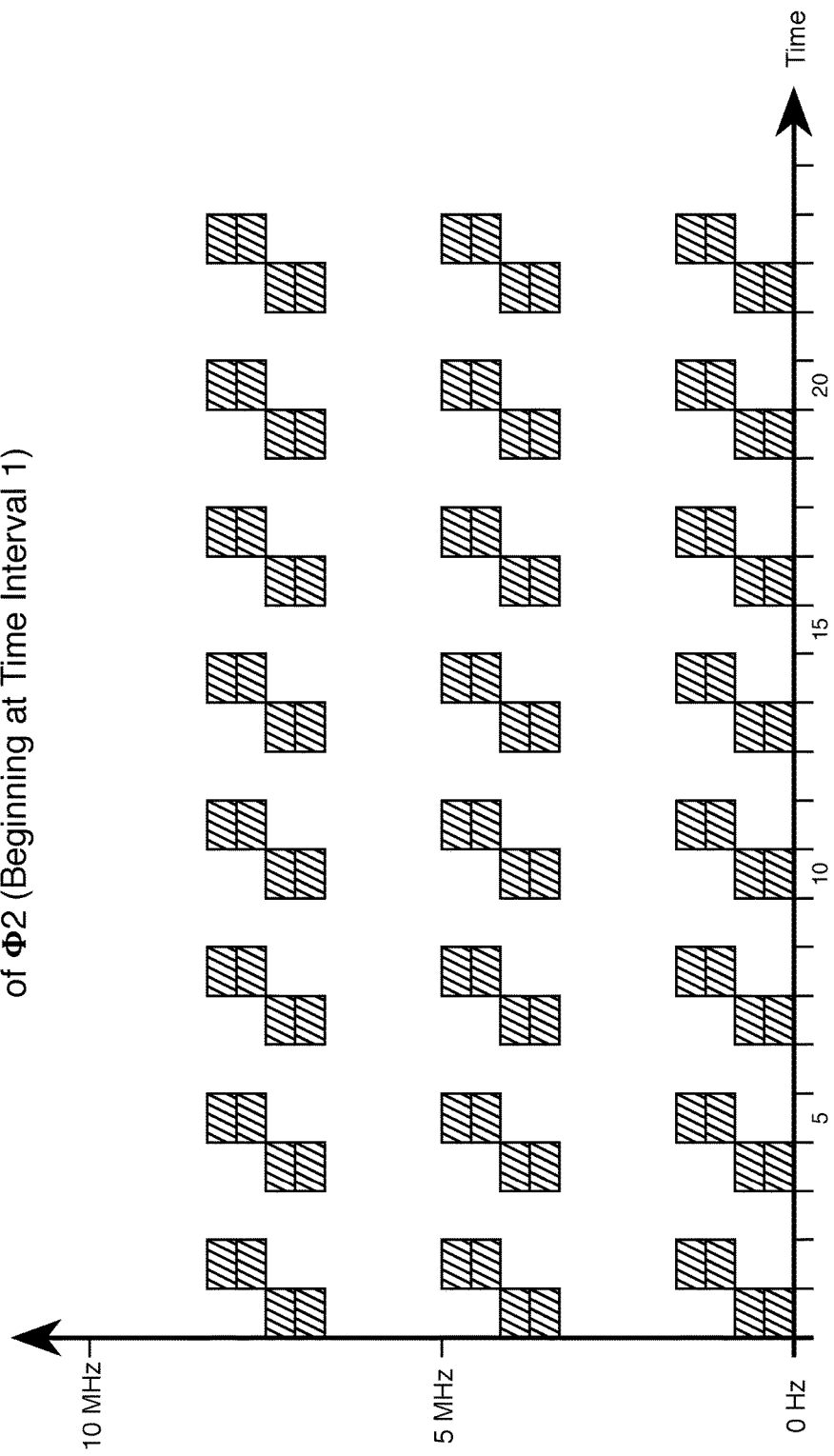

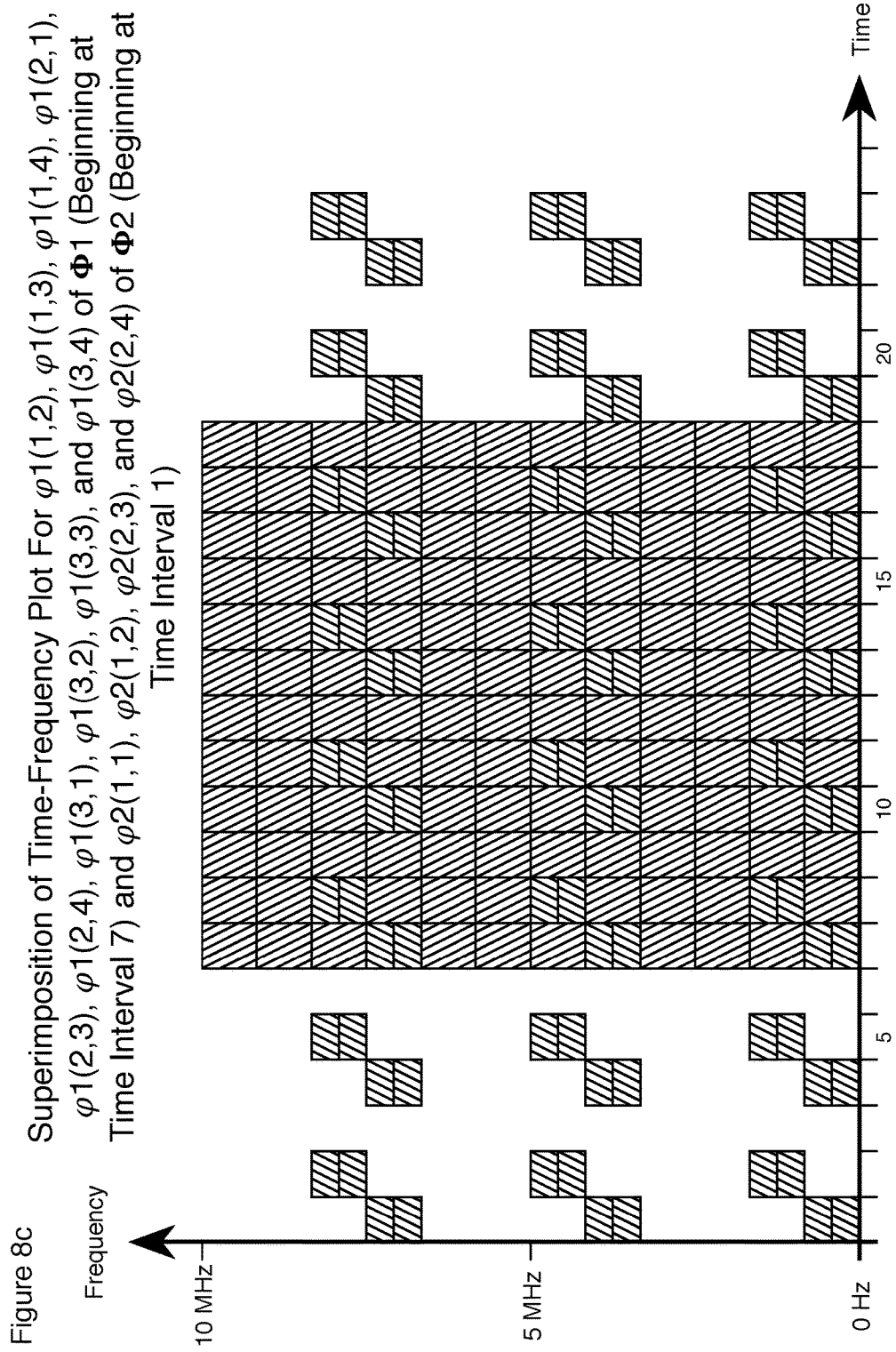
Figure 8c  Superimposition of Time-Frequency Plot For $\varphi1(1,2)$, $\varphi1(1,3)$, $\varphi1(1,4)$, $\varphi1(2,1)$, $\varphi1(2,3)$, $\varphi1(2,4)$, $\varphi1(3,1)$, $\varphi1(3,2)$, $\varphi1(3,3)$, and $\varphi1(3,4)$ of $\Phi1$ (Beginning at Time Interval 7) and $\varphi2(1,1)$, $\varphi2(1,2)$, $\varphi2(2,3)$, and $\varphi2(2,4)$ of $\Phi2$ (Beginning at Time Interval 1)

WIRELESS TELECOMMUNICATIONS SYSTEM FOR HIGH-MOBILITY APPLICATIONS

STATEMENT OF RELATED APPLICATIONS

This application claims benefit of:
U.S. provisional patent application No. 62/316,243, filed on 31 Mar. 2016, entitled "Robust Wireless Telecommunications System,", and
U.S. provisional patent application No. 62/316,298, filed on 31 Mar. 2016, entitled "Orthogonal Time Frequency Space,",
both of which are incorporated by reference.
The following patent applications are incorporated by reference:
U.S. patent application Ser. No. 15/146,987, filed on 5 May 2016, entitled "Wireless Telecommunications System for High-Mobility Applications,", and
U.S. patent application Ser. No. 15/215,007, filed on 20 Jul. 2016, entitled "Multiple Access in Wireless Telecommunications System for High-Mobility Applications,", and
U.S. patent application Ser. No. 15/410,622, filed on 19 Jan. 2017, entitled "Multiple Access in Wireless Telecommunications System For High-Mobility Applications."

FIELD OF THE INVENTION

The present invention relates to wireless telecommunications in general, and, more particularly, to a wireless telecommunications system that can detect and mitigate impairments to its radio signals.

BACKGROUND OF THE INVENTION

A radio signal can be impaired as it propagates from a transmitter to a receiver, and the value of a wireless telecommunications system is substantially dependent on how well the system mitigates the effects of those impairments. In some cases, the transmitter can take preventative measures, and in some cases the receiver can take remedial measures.

SUMMARY OF THE INVENTION

The present invention is a wireless telecommunications system that avoids some of the costs and disadvantages associated with wireless telecommunications systems in the prior art. For example, the illustrative embodiments of the present invention use a modulated radio-frequency carrier signal to convey data items wirelessly through a radio-frequency environment that comprises natural and man-made radio-frequency signal-path impairments (e.g., objects, etc.) that reflect, refract, diffract, and absorb the modulated radio-frequency carrier signal.

A consequence of the presence of the signal-path impairments is that the radio receiver receives both direct-path and multipath images of the signal, which can cause infra-symbol and inter-symbol interference. The illustrative embodiments of the present invention are able to discriminate between direct-path and multipath images, which (substantially) prevents infra-symbol interference and enables the remediation of inter-symbol interference. Furthermore, the illustrative embodiments are also particularly effective remediating the effects of Doppler-shift impairments in the radio channel.

The illustrative embodiment of the present invention modulates the radio-frequency carrier signal with waveforms that are constructed to (substantially) prevent infra-symbol interference and enable the remediation of inter-symbol interference and Doppler-shift impairments.

As described in detail below, the nature of the waveforms is such that temporally-longer waveforms are better at preventing infra-symbol interference but introduce greater latency to the communications. Therefore, temporally-longer waveforms are less suitable for data items that are less latency tolerant (e.g., bi-directional voice communications, etc.) but more acceptable for data items that are high latency tolerant (e.g., broadcast uni-directional television, etc.). Temporally-longer waveforms are also advantageous as pilot signals and to discover the precise nature of the signal-path impairments.

In contrast, temporally-shorter waveforms are less effective in preventing infra-symbol interference but are more suitable for low latency tolerant data items. The illustrative embodiments of the present invention enables temporally-longer waveforms and temporally-shorter waveforms to be used concurrently in the same communications channel. This is advantageous for several reasons, including but not limited to, the ability of the telecommunications system to adapt on-the-fly the mix of longer and shorter waveforms based on the latency tolerance of the data items queued for transmission.

BRIEF DESCRIPTION OF THE DRAWINGS

FIG. 6a depicts a plot of where the energy associated with waveform $\phi 1(1,1)$ of waveform array $\Phi 1$ (M1=3, N1=4) beginning at Time Interval 1 is deposited into a 10 MHz radio channel.

FIG. 6b depicts a plot of where the energy associated with waveform $\phi 2(1,1)$ of waveform array $\Phi 2$ (M2=3, N2=8) beginning at Time Interval 1 is deposited into the same 10 MHz radio channel.

FIG. 6c depicts a plot of the inter-symbol interference that occurs when waveform $\phi 1(1,1)$ (as shown in FIG. 6a) and waveform $\phi 2(1,1)$ (as shown in FIG. 6b) both beginning at Time Interval 1 transmitted into the radio channel.

FIG. 7b depicts a plot of where the energy associated with waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) of waveform array Φ1 (M1=3, N1=4) is deposited into the 10 MHz radio channel beginning at time interval 1 (i.e., depicted by the left-slanted diagonally-striped blocks).

FIG. 7c depicts a plot of where the energy associated with waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) of waveform array Φ1 (M1=3, N1=4) is deposited into the 10 MHz radio channel beginning at time interval 13 (i.e., depicted by the left-slanted diagonally-striped blocks).

FIG. 7d depicts FIGS. 7a, 7b, and 7c superimposed.

FIG. 8a depicts a plot of where the energy associated with waveforms φ2(1,1), φ2(1,1), φ2(2,3), and φ2(2,4) of waveform array Φ2 (M2=3, N2=8) is deposited into a 10 MHz radio channel beginning at time interval 1 (i.e., depicted by the right-slanted diagonally-striped blocks).

FIG. 8c depicts FIGS. 8a and 8b superimposed.

DETAILED DESCRIPTION

Figure 1A:
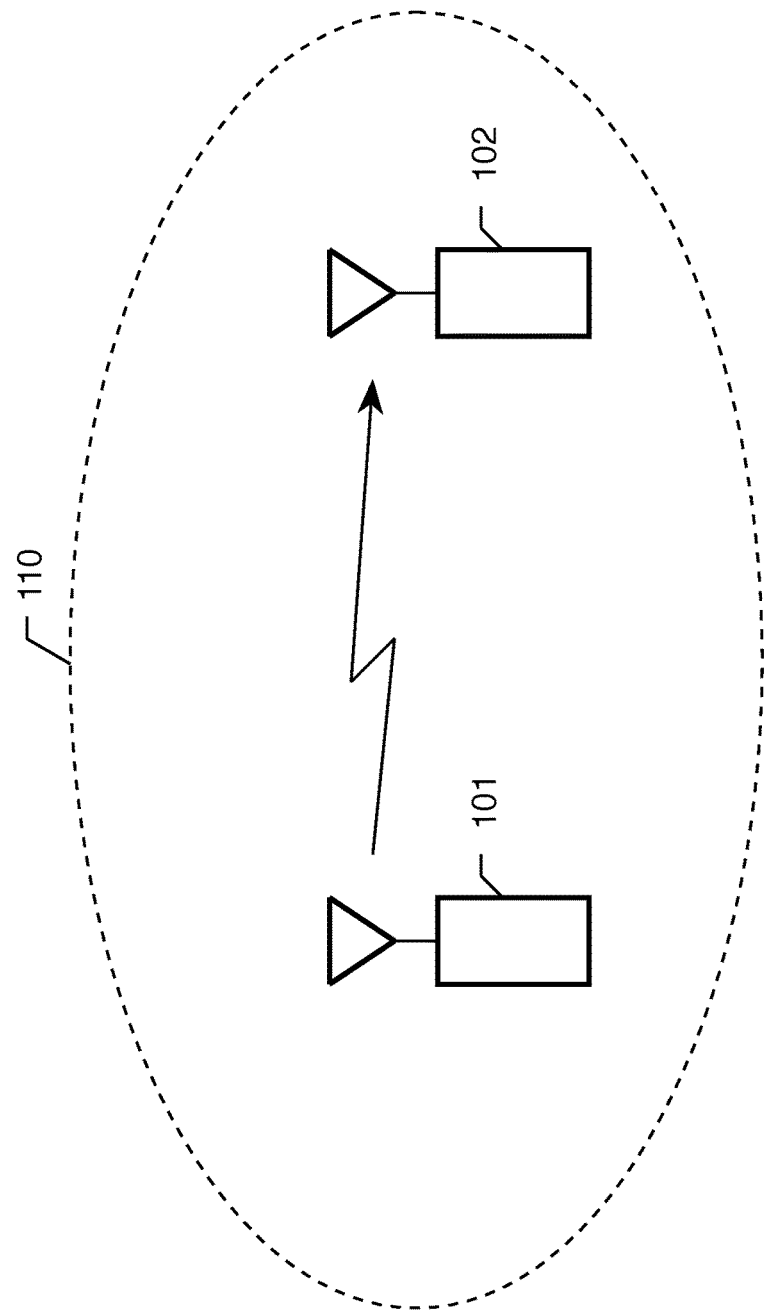
FIG. 1A depicts a block diagram of the salient components of wireless telecommunications system 100 in accordance with the illustrative embodiment of the present invention.

FIG. 1A depicts a block diagram of the salient components of wireless telecommunications system 100 in accordance with the illustrative embodiment of the present invention. Wireless telecommunications system 100 comprises radios 101 and 102, which are both situated in geographic region 110.

In accordance with the illustrative embodiment, radio 101 transmits a modulated radio-frequency carrier signal to radio 102. It will be clear to those skilled in the art, however, after reading this disclosure, how to make and use embodiments of the present invention in which radio 101 transmits a modulated radio-frequency carrier signal to radio 102 and radio 102 transmits a modulated radio-frequency carrier signal to radio 101.

In accordance with the illustrative embodiment, radio 101 transmits a plurality of data items to radio 102, which data items represent sound, images, video, data, and signaling. It will be clear to those skilled in the art how to make radio 101 so that it can de-construct sound, images, video, data, and signaling into data items, and it will be clear to those skilled in the art how to make radio 102 so that it can re-construct sound, images, video, data, and signaling from those data items.

In accordance with the illustrative embodiment, each data item is represented by a complex number that corresponds to one symbol in a 16 quadrature-amplitude ("16 QAM") signal constellation modulation scheme. It will be clear to those skilled in the art, however, after reading this disclosure, how to make and use alternative embodiments of the present invention in which each data item corresponds to a symbol in any digital modulation scheme (e.g., frequency-shift keying, amplitude-shift keying, phase-shift keying, etc.).

In accordance with the illustrative embodiment, wireless telecommunications system 100 comprises two radios, but it will be clear to those skilled in the art, after reading this disclosure, how to make and use alternative embodiments of the present invention that comprise any number of radios.

In accordance with the illustrative embodiment, wireless telecommunications system 100 operates in point-to-point (i.e., 1:1) mode. It will be clear to those skilled in the art, however, after reading this disclosure, how to make and use embodiments of the present invention that operate in broadcast (i.e., 1:>1) mode.

In accordance with the illustrative embodiment, radios 101 and 102 are mobile, but it will be clear to those skilled in the art, after reading this disclosure, how to make and use alternative embodiments of the present invention in which each radio is either mobile or stationary.

In accordance with the illustrative embodiment, geographic region 110 comprises natural and man-made radio-frequency signal-path impairments (e.g., objects, etc.) (not shown) that reflect, refract, diffract, and absorb the modulated radio-frequency carrier signals that propagate from radio 101 to radio 102. Furthermore, some of the radio-frequency signal-path impairments are stationary (e.g., trees, hills, buildings, etc.) and some are mobile (e.g., trucks, ships, airplanes, etc.).

In accordance with the illustrative embodiment, the parameters that characterize the signal-path impairments in the radio channel between radios 101 and 102 are dynamic (i.e., change with respect to time). It will be clear to those skilled in the art, after reading this disclosure, how to make and use embodiments of the present invention in which the characteristics of the radio channel and the nature of the signal-path impairments are static (i.e., do not change with respect to time).

In accordance with the illustrative embodiment, radio 101 transmits the modulated radio-frequency carrier signal to radio 102 in a channel that is B=10 MHz wide. It will be clear to those skilled in the art, however, after reading this disclosure, how to make and use alternative embodiments of the present invention in which the radio channel has different bandwidth (e.g., 2.5 MHz, 5.0 MHz, 12.5 MHz, 15 MHz, 20 MHz, 40 MHz, 80 MHz, etc.).

Figure 1B:
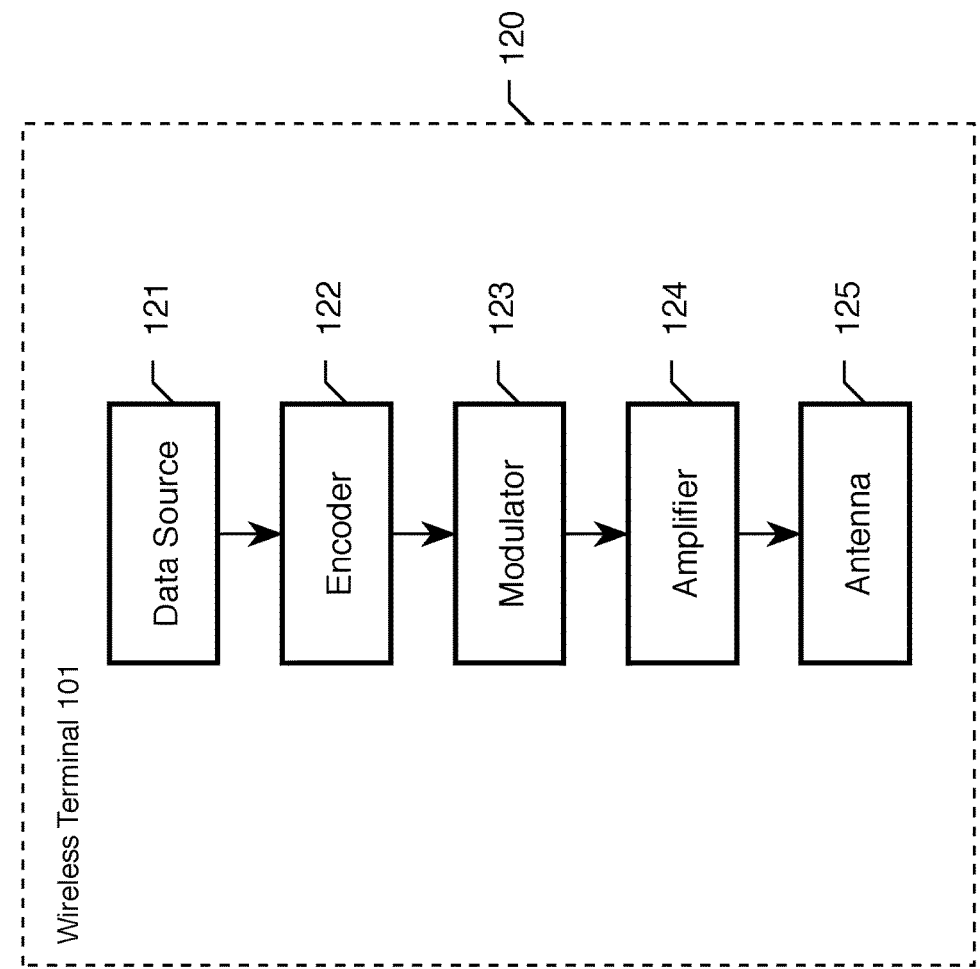
FIG. 1B depicts a block diagram of the salient components of radio 101 in accordance with the illustrative embodiment of the present invention.

FIG. 1B depicts a block diagram of the salient components of radio 101 in accordance with the illustrative embodiment of the present invention. Radio 101 comprises: data source 121, encoder 122, modulator 123, amplifier 124, and antenna 125.

Data source 121 comprises the hardware and software necessary to convert external stimuli (e.g., sound, light, a user's keystrokes, etc.) and internal stimuli (e.g., radio-frequency measurements, signaling, etc.) into data items to be transmitted to radio 102. It will be clear to those skilled in the art how to make and use data source 121.

Encoder 122 comprises the hardware and software necessary to compress, encrypt, and add forward error correction to the data items generated by data source 121. It will be clear to those skilled in the art how to make and use encoder 122.

Modulator 123 comprises the hardware and software necessary to modulate a radio-frequency carrier signal with the data items from encoder 122 to generate a modulated radio-frequency carrier signal. The construction and operation of modulator 123 is described in detail herein and in the accompanying figures.

Amplifier 124 comprises the hardware necessary to increase the power of the modulated radio-frequency carrier signal for transmission via antenna 125. It will be clear to those skilled in the art how to make and use amplifier 124.

Antenna 125 comprises the hardware necessary to facilitate the radiation of the modulated radio-frequency carrier signal wirelessly through space to radio 102.

Figure 2:
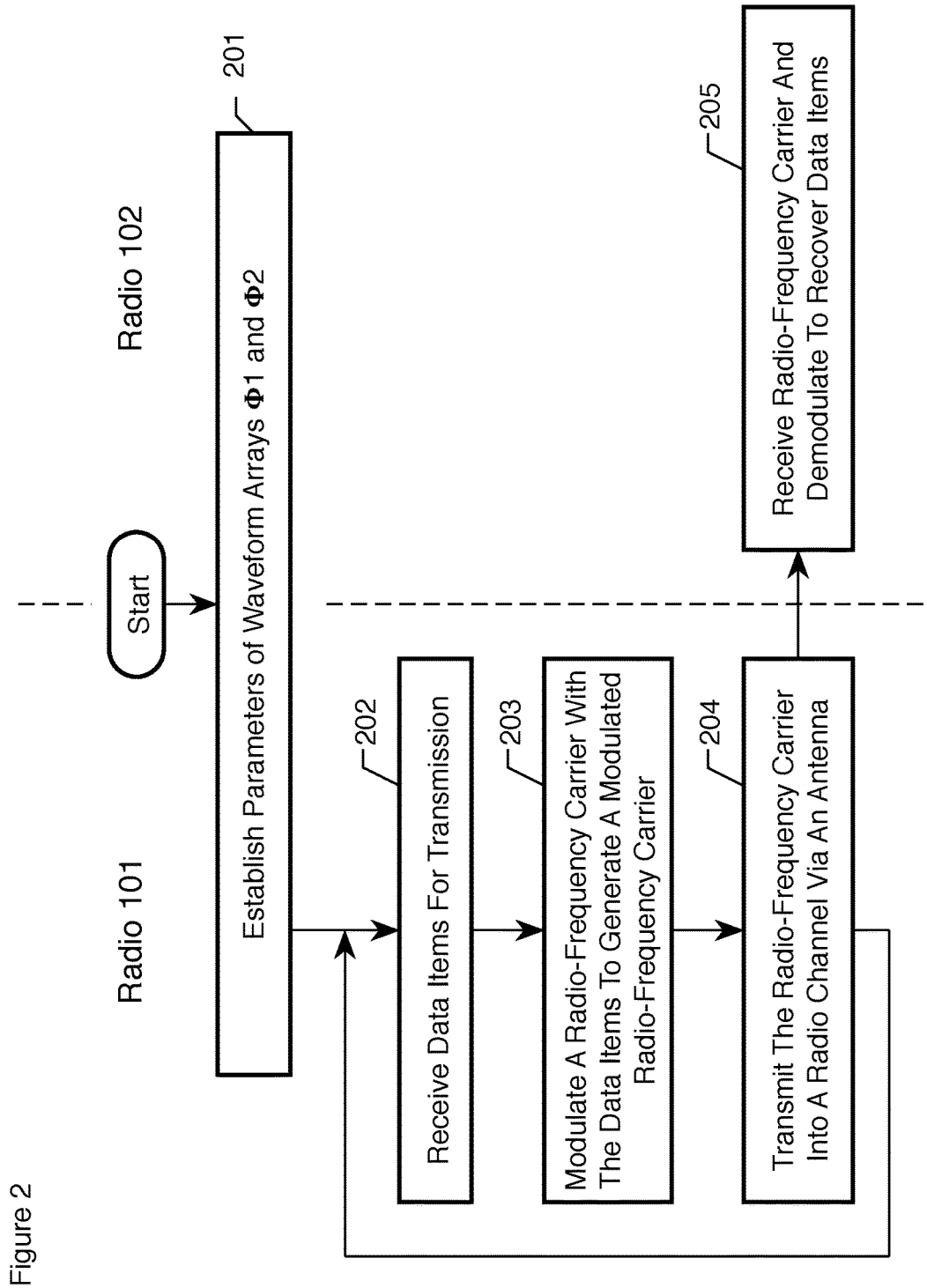
FIG. 2 depicts a flowchart of the salient tasks performed by radios 101 and 102 in accordance with the illustrative embodiment of the present invention.

FIG. 2 depicts a flowchart of the salient tasks performed by radios 101 and 102 in accordance with the illustrative embodiment of the present invention.

At task 201, radios 101 and 102 establish the parameters of a two waveform arrays—waveform arrays Φ1 and Φ2—to mitigate infra-symbol interference caused by Doppler-shift and multipath interference. In accordance with the illustrative embodiment, radios 101 and 102 establish the parameters of two waveforms arrays—and use the some or all of the waveforms of the two arrays to convey data items—but it will be clear to those skilled in the art, after reading this disclosure, how to make and use alternative embodiments of the present invention that establish the parameters of any number (e.g., three, four, six, eight, twelve, sixteen, thirty-two, sixty-four, etc.) of waveform arrays and use some or all of the waveforms of those arrays to convey data items.

As is described below, each waveform array Φj is characterized by two parameters Mj and Nj, wherein Mj and Nj are a positive integers greater than one and j∈{1, 2} (i.e., Φ1 is characterized by parameters M1 and N1 and Φ2 is characterized by parameters M2 and N2).

In accordance with the first illustrative embodiment, M1=M2=3, N1=4 and N2=8 (i.e., M1=M2 and N1≠N2). In accordance with the second illustrative embodiment, M1=3, M2=6, and N1=N2=4 (i.e., M1≠M2 and N1=N2). In accordance with the third illustrative embodiment, M1=3, M2=6, N1=4, and N2=8 (i.e., M1≠M2 and N1≠N2). In all three illustrative embodiments, M1·N1≠M2·N2.

It will be clear to those skilled in the art, after reading this disclosure, how to make and use alternative embodiments of the present invention with any combination of values of M1, M2, N1, and N2. Furthermore, it will be clear to those skilled in the art, after reading this disclosure, that embodiments of the present invention are typically simplified and more efficient by making M2 an integral multiple of M1 (e.g., 2×, 3×, 4×, 5×, 6×, 8×, 12×, 16×, 32×, 64×, 128×, etc.). And still furthermore, it will be dear to those skilled in the art, after reading this disclosure, that embodiments of the present invention are typically simplified and more efficient by making N2 an integral multiple of N1 (e.g., 2×, 3×, 4×, 5×, 6×, 8×, 12×, 16×, 32×, 64×, 128×, etc.).

In accordance with the illustrative embodiment, the parameters of waveform arrays Φ1 and Φ2 are established once when radios 101 and 102 first establish communication, but it will be clear to those skilled in the art, after reading this disclosure, how to make and use alternative embodiments of the present invention in which the radios periodically or sporadically re-establish the parameters of waveform array Φ1 or waveform array Φ2 or waveform arrays Φ1 and Φ2. For example and without limitation, radios 101 and 102 can re-establish the parameters of waveform arrays Φ1 and Φ2 when:
  i. the traits of the signal path from change, or
  ii. the type of data represented by the data items changes, or
  iii. the latency tolerance of the data items changes, or
  iv. any combination of i, ii, and iii.

As is described in detail below, waveform arrays Φ1 and Φ2 comprise waveforms that convey data items from radio 101 to radio 102. In accordance with the illustrative embodiment, radios 101 and 102 convey low-latency tolerant data items using waveform array Φ1, and high-latency tolerant data items using waveform array Φ2. It will be clear to those skilled in the art, after reading this disclosure, how to make and use alternative embodiments of the present invention in which radios 101 and 102 use the waveforms in different waveform arrays for:
  i. different conditions of the signal path from radio 101 to radio 102, or
  ii. different types of data items, or
  iii. different latency tolerance of the data items, or
  iv. any combination of i, ii, and iii.

Basic Waveforms—Waveform array Φj is based on an extension of Mj basic waveforms bj(1), . . . , bj(mj), . . . , bj(Mj) that are orthogonal in Mj-dimensional vector space, where Mj is a positive integer greater than 1, and mj is a positive integer in the range m∈{1, . . . , Mj}.

Figure 3:
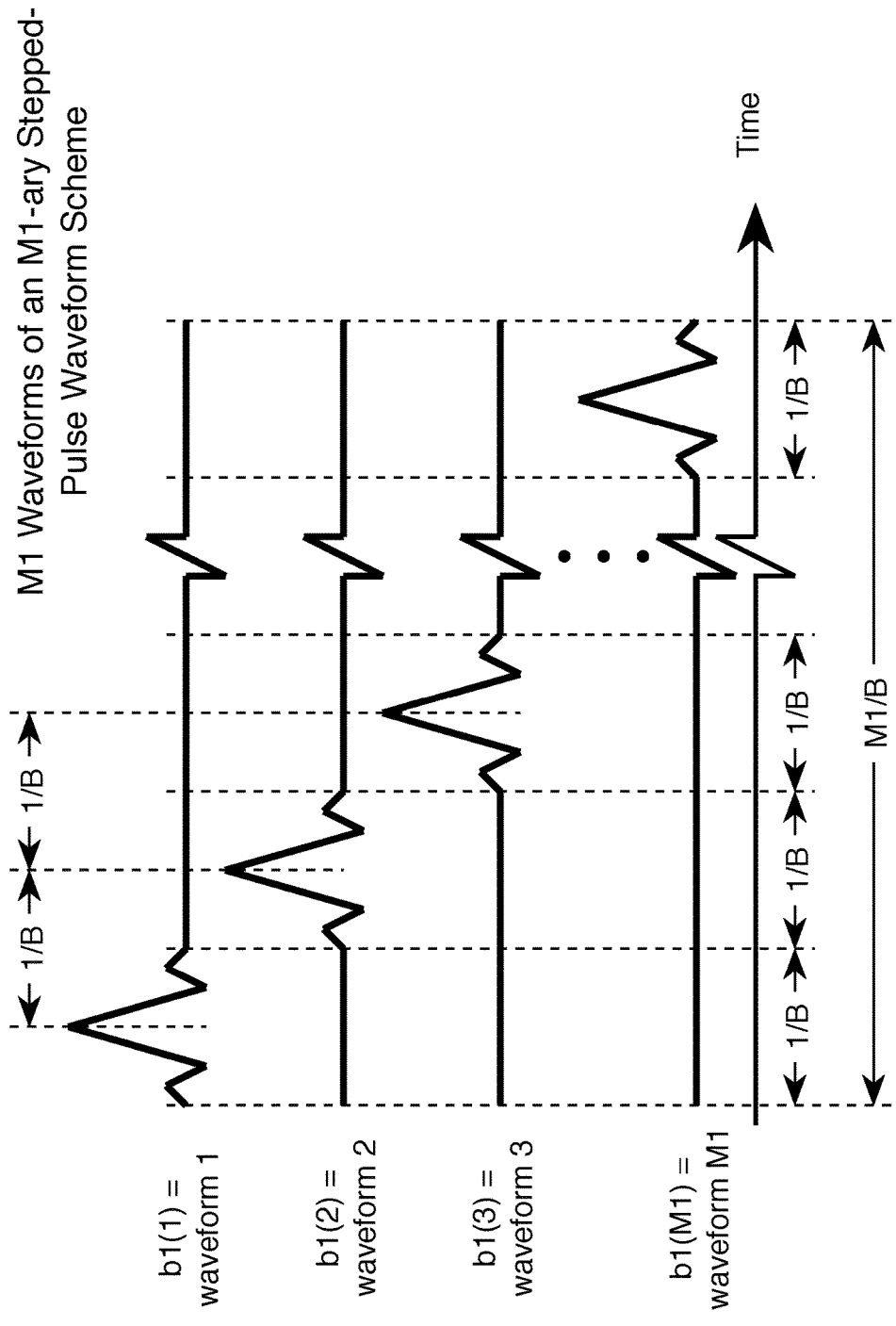
FIG. 3 depicts a waveform array $\Phi 1$ is based on M1 orthogonal M1-ary stepped-pulse waveforms.

In accordance with all of the illustrative embodiments, basic waveform bj(mj) is waveform mj of a Mj-ary stepped-pulse waveform scheme, as depicted in FIG. 3. In accordance with all of the illustrative embodiments, each pulse is a band-limited raised-cosine pulse but it will be clear to those skilled in the art, after reading this disclosure, how to make and use alternative embodiments of the present invention in which each pulse has a different shape.

Each pulse in basic waveform bj(mj) is band-limited, and, therefore, the duration of each pulse is 1/B seconds, wherein B is the bandwidth of the channel. Furthermore, the centers of adjacent pulses are separated by 1/B seconds. And still furthermore, the total duration of each basic waveform bj(mj) is Mj/B seconds.

Although all of the illustrative embodiments uses stepped-pulse waveforms as the basic waveforms, it will be clear to those skilled in the art, however, after reading this disclosure, how to make and use alternative embodiments of the present invention in which waveform array Φj is based on any set of Mj orthogonal waveforms, bj(1), . . . , bj(Mj).

Structure of Waveform Array Φ—Waveform array Φj comprises Mj·Nj waveforms that are orthogonal in Mj·Nj-dimensional vector space. The Mj·Nj waveforms of waveform array Φj are φj(1,1), . . . , φj(mj,nj), . . . , φj(Mj,Nj), where nj is a positive integer in the range nj∈{1, . . . , Nj}.

Each waveform φj(mj,nj) is the sum of Nj waveforms yj(mj,nj,1), . . . , yj(mj,nj,pj), . . . , yj(mj,nj,Nj).

Each waveform φj(mj,nj) is identically partitioned into Nj time slots 1, . . . , pj, . . . , Nj, where pj is a positive integer in the range pj∈{1, . . . , Nj}. Waveform yj(mj,nj,pj) occupies time slot pj in waveform φj(mj,pj) and equals:

$$yj(mj,nj,pj) = bj(mj) \cdot u(nj,pj) \quad \text{(Eq. 1)}$$

wherein u(nj,pj) is a phasor that equals:

$$u(nj,pj) = \exp(2\pi(nj-1)(pj-1)1/Nj) \quad \text{(Eq. 2)}$$

The duration of waveform y(mj,nj,pj) defines the duration of time slot pj.

Figure 4:
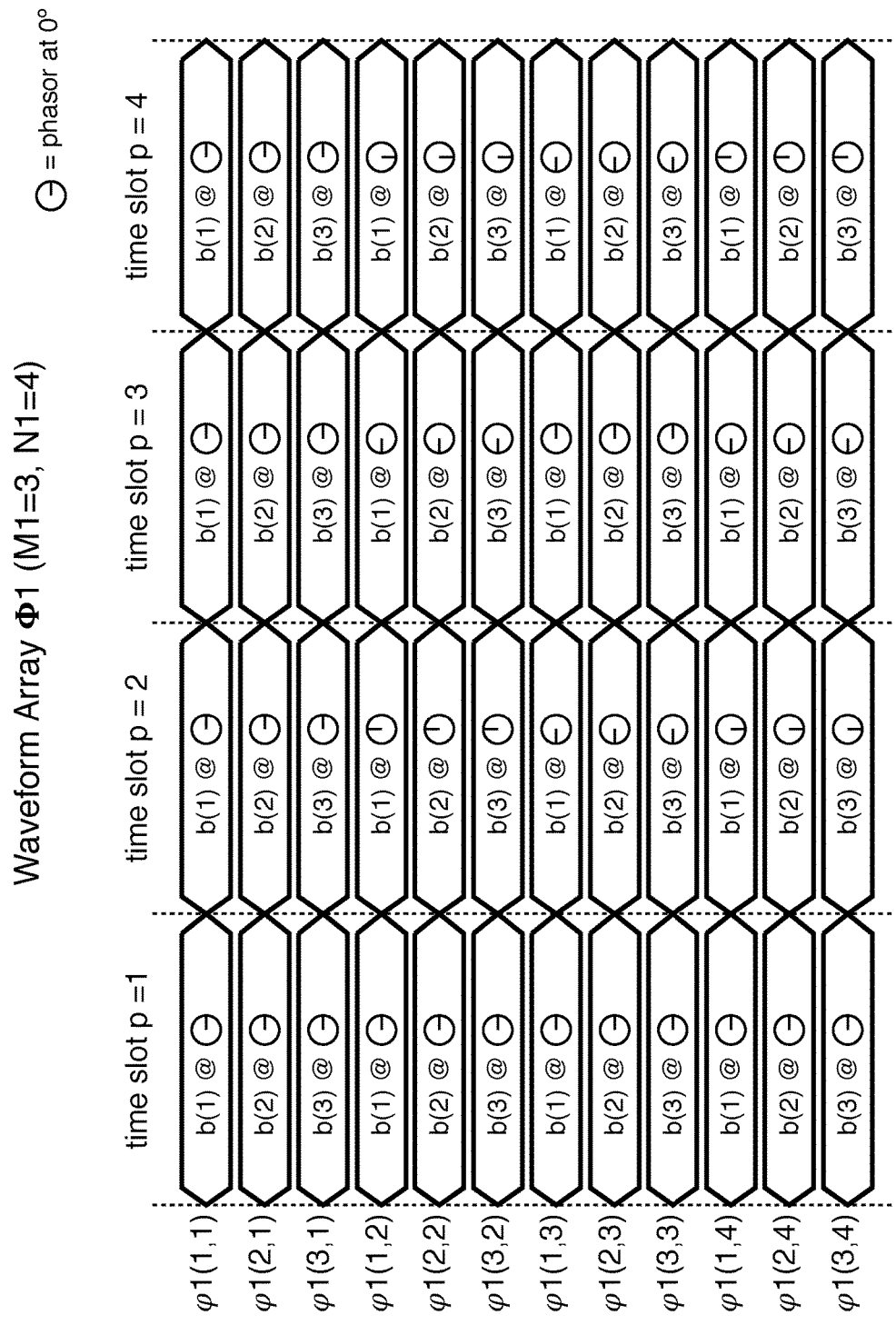
FIG. 4 depicts the composition of waveform array $\Phi 1$ (M1=3, N1=4) for any set of orthogonal basic waveforms.
Figure 5:
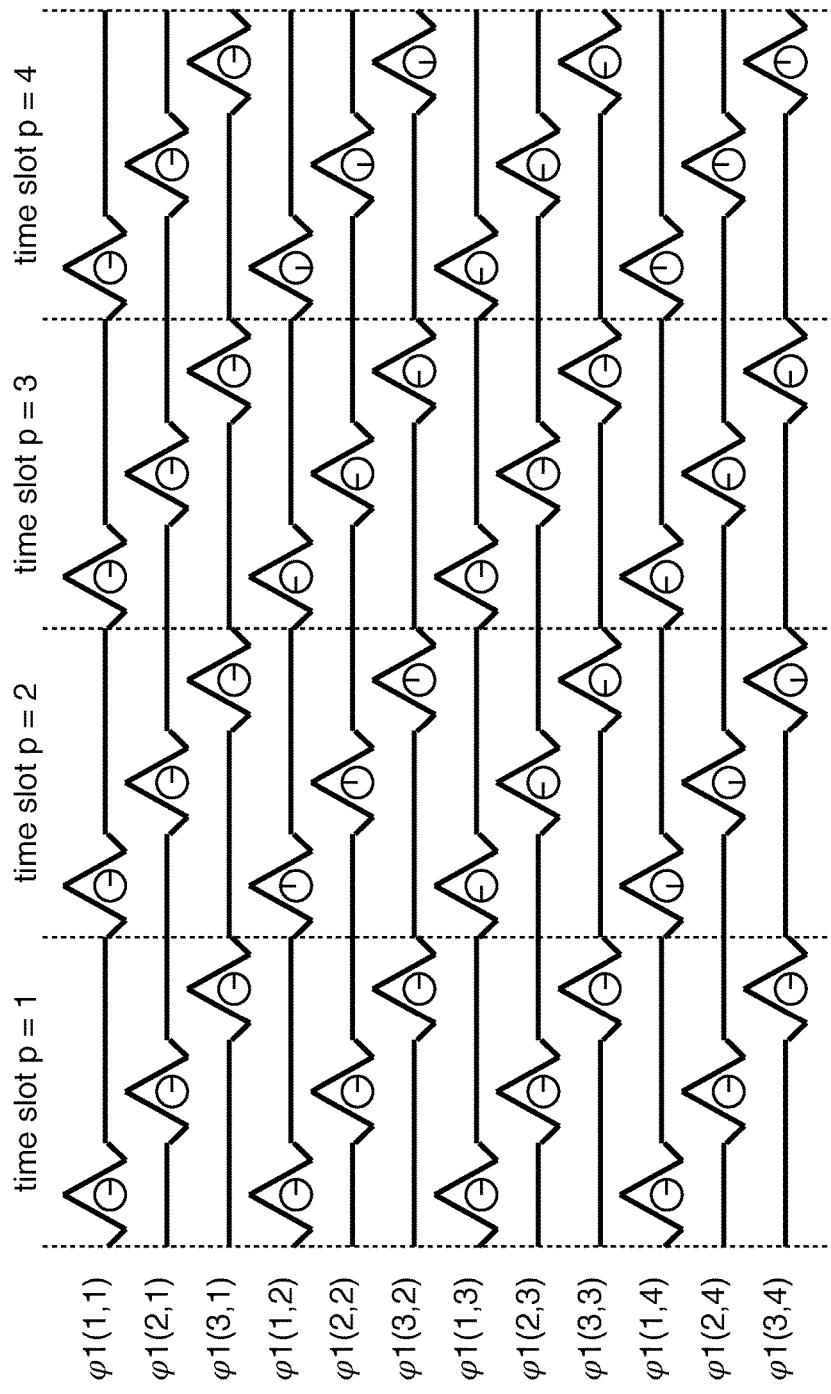
FIG. 5 depicts the composition of waveform array $\Phi 1$ (M1=3, N1=4) for the stepped-pulse waveform.

An illustrative waveform array Φ1 (M1=3 and N1=4) is depicted in FIG. 4 and FIG. 5, and the phasors u(n,p) associated with waveform array Φ1 are depicted in Table 1.

TABLE 1

Phasors u(n1, p1) for Each Waveform y1(m1, n1, p1) in Waveform Array Φ1

|  | time slot p1 = 1 | time slot p1 = 2 | time slot p1 = 3 | time slot p1 = 4 |
| --- | --- | --- | --- | --- |
| y1(m1, 1, p1) | 1 + 0i | 1 + 0i | 1 + 0i | 1 + 0i |
| y1(m1, 2, p1) | 1 + 0i | 0 + 1i | −1 + 0i | 0 − 1i |
| y1(m1, 3, p1) | 1 + 0i | −1 + 0i | 1 + 0i | −1 + 0i |
| y1(m1, 4, p1) | 1 + 0i | 0 − 1i | −1 + 0i | 0 + 1i |

The Mj·Nj waveforms of waveform array Φj partition the time-frequency space of the modulated radio-frequency carrier signal into 1/B second-long "time intervals" and Mj·Nj "frequency sub-bands." Each waveform array Φj constitutes a "frame" of Mj·Nj time intervals, and the least common multiple of Mj·Nj for all j (e.g., the LCM(M1·N1, M2·N2) for j∈{1, 2}) constitutes a superframe of time intervals. The temporal start of each waveform is specified relative to the first time interval in the superframe.

A salient characteristic of the illustrative embodiment is that each waveform φj(mj,nj) in waveform array Φj deposits energy into:
  i. unique time-frequency portions the radio channel, and
  ii. 1/Mj·Nj$^{th}$ of the radio channel during the frame of waveform array Φj.
This is illustrated in FIGS. 6a and 6b.

For example, FIG. 6a depicts a plot of where the energy associated with waveform φ1(1,1) of waveform array Φ1 (M1=3, N1=4) beginning at Time Interval 1 is deposited into a 10 MHz radio channel. In FIG. 6a the radio channel is depicted as divided into twelve (M1·N1=12) 833.3 KHz frequency sub-bands (B=10 MHz/M1·N1=12) and twelve (M1·N1=12) 0.1 microsecond (1/B=10 MHz) time intervals. In FIG. 6a, it can be seen that energy is deposited only in those time intervals when the raised-cosine pulse exists and only in the frequency sub-bands 0-0.833 MHz, 3.333-4.167 MHz, and 6.667-7.500 MHz (i.e., depicted by the left-slanted diagonally-striped blocks) in the channel.

Similarly, FIG. 6b depicts a plot of where the energy associated with waveform φ2(1,1) of waveform array Φ2 (M2=3, N2=8) beginning at Time Interval 1 is deposited into the same 10 MHz radio channel. In FIG. 6b the radio channel is depicted as divided into twenty-four 416.66 KHz frequency sub-bands (B=10 MHz/M2·N2=24) and twenty-four (M2·N2=24) 0.1 microsecond (1/B=10 MHz) time intervals. In FIG. 6b, it can be seen that energy is deposited only in those time intervals when the raised-cosine pulse exists and only in the frequency sub-bands 0-0.416 MHz, 3.333-3.749 MHz, and 6.667-7.084 MHz (i.e., depicted by the right-slanted diagonally-striped blocks) in the channel.

It will be clear to those skilled in the art how to determine when and where any given waveform φj(mj,nj) will deposit energy into a radio channel using Fourier analysis in well-known fashion.

In accordance with the illustrative embodiment, radio 101 selects individual waveforms from waveform arrays Φ1 and Φ2 to convey data items to radio 102, and selects those waveforms so that:
  I. no two waveforms overlap the time-frequency space of the modulated radio-frequency carrier signal (to prevent inter-symbol interference), and
  II. all of the time-frequency space of the modulated radio-frequency carrier signal has energy deposited into it (to maximize spectral efficiency), and
  III. waveforms from waveform array Φ1 convey data items with low-latency tolerance and waveforms from waveform array Φ2 convey data items with high-latency tolerance.

To accomplish this, radio 101 interleaves waveforms from waveform array Φ1 and waveforms from waveform array Φ2. In other words, waveforms from waveform array Φ1 and waveforms from waveform array Φ2 overlap in time in the modulated radio-frequency carrier signal.

For example, FIG. 6c depicts a plot of the inter-symbol interference that occurs when waveform φ1(1,1) (as shown in FIG. 6a) and waveform φ2(1,1) (as shown in FIG. 6b) both beginning at Time Interval 1 transmitted into the radio channel. In FIG. 6c, it can be clearly seen that both waveform φ1(1,1) and waveform φ2(1,1) deposit energy into the same time-frequency space—the frequency sub-bands 0-0.416 MHz, 3.333-3.749 MHz, and 6.667-7.084 MHz (i.e., the cross-hatched blocks) during the first, fourth, seventh, and tenth time intervals.

In contrast, FIGS. 7a, 7b, 7c, and 7d depict the interleaving of waveforms from waveform arrays Φ1 and Φ2 to convey 24 data items in 24 time intervals so that no two waveforms deposit energy into the time-frequency space of the modulated radio-frequency carrier signal. In this example, radio 101 has 24 data items to transmit to radio 102. Of the 24 data items, two are high-latency-tolerant data items and are stored in a high-latency queue (shown in Table 2) and 22 are low-latency tolerant data items and are stored in a low-latency queue (shown in Table 3).

TABLE 2

High-Latency Tolerant Data Item Queue

| Data Item | Conveying Waveform | Beginning Time Interval |
|---|---|---|
| 1 | φ2(1, 1) | 1 |
| 2 | φ2(1, 2) | 1 |

TABLE 3

Low-Latency Tolerant Data Item Queue

| Data Item | Conveying Waveform | Beginning Time Interval |
|---|---|---|
| 1 | φ1(1, 2) | 1 |
| 2 | φ1(1, 3) | 1 |
| 3 | φ1(1, 4) | 1 |
| 4 | φ1(2, 1) | 1 |
| 5 | φ1(2, 2) | 1 |
| 6 | φ1(2, 3) | 1 |
| 7 | φ1(2, 4) | 1 |
| 8 | φ1(3, 1) | 1 |
| 9 | φ1(3, 2) | 1 |
| 10 | φ1(3, 3) | 1 |
| 11 | φ1(3, 4) | 1 |
| 12 | φ1(1, 2) | 13 |
| 13 | φ1(1, 3) | 13 |
| 14 | φ1(1, 4) | 13 |
| 15 | φ1(2, 1) | 13 |
| 16 | φ1(2, 2) | 13 |
| 17 | φ1(2, 3) | 13 |
| 18 | φ1(2, 4) | 13 |
| 19 | φ1(3, 1) | 13 |
| 20 | φ1(3, 2) | 13 |
| 21 | φ1(3, 3) | 13 |
| 22 | φ1(3, 4) | 13 |

Figure 7A:
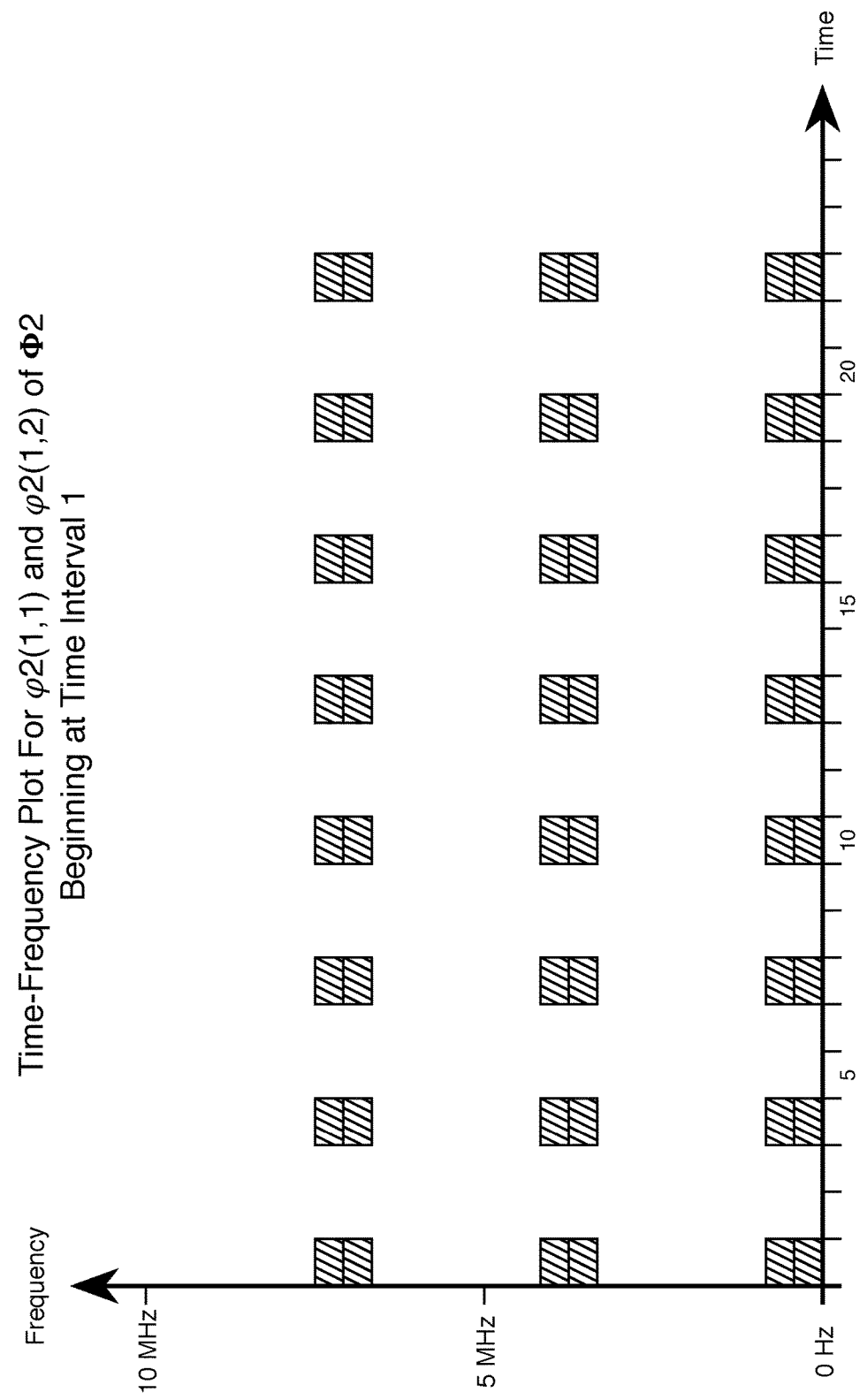
FIG. 7a depicts a plot of where the energy associated with waveforms $\phi 2(1,1)$ and $\phi 2(1,1)$ of waveform array $\Phi 2$ (M2=3, N2=8) is deposited into a 10 MHz radio channel beginning at time interval 1 (i.e., depicted by the right-slanted diagonally-striped blocks). Waveforms φ2(1,1) and φ2(1,2) convey high-latency tolerant data items 1 and 2, respectively.

FIG. 7a depicts a plot of where the energy associated with waveforms φ2(1,1) and φ2(1,1) of waveform array Φ2 (M2=3, N2=8) is deposited into a 10 MHz radio channel beginning at time interval 1 (i.e., depicted by the right-slanted diagonally-striped blocks). Waveforms φ2(1,1) and φ2(1,2) convey high-latency tolerant data items 1 and 2, respectively.

FIG. 7b depicts a plot of where the energy associated with waveforms φ1(1,2), φ1(1,3), φ1(1,4), φ1(2,1), φ1(2,2), φ1(2, 3), φ1(2,4), φ1(3,1), φ1(3,2), φ1(3,3), and φ1(3,4) (i.e., φ1(m≠1,n≠1)) of waveform array Φ1 (M1=3, N1=4) is deposited into the 10 MHz radio channel beginning at time interval 1 (i.e., depicted by the left-slanted diagonally-striped blocks). Waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) convey low-latency tolerant data items 1, 2, 3, 4, 5, 6, 7, 8, 9, 10, and 11, respectively.

FIG. 7c depicts a plot of where the energy associated with waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) of waveform array Φ1 (M1=3, N1=4) is deposited into the 10 MHz radio channel beginning at time interval 13 (i.e., depicted by the left-slanted diagonally-striped blocks). Waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) convey low-latency tolerant data items 12, 13, 14, 15, 16, 17, 18, 19, 20, 21, and 22, respectively.

FIG. 7d depicts FIGS. 7a, 7b, and 7c superimposed, which illustrates the interleaving of 24 waveforms from waveform arrays Φ1 and Φ2 such that:

I. no two waveforms overlap the time-frequency space of the modulated radio-frequency carrier signal (to prevent inter-symbol interference), and II. all of the time-frequency space of the modulated radio-frequency carrier signal has energy deposited into it (to maximize spectral efficiency), and III. waveforms from waveform array Φ1 convey data items with low-latency tolerance and waveforms from waveform array Φ2 convey data items with high-latency tolerance.

Because waveforms φ2(1,1) and φ2(1,1) of waveform array Φ2 begin at the same time interval (Time Interval 1) as the eleven waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) of waveform array Φ1 that also begin at Time Interval 1, each of waveforms φ2(1,1) and φ2(1,1) is deemed to be "frame aligned" with each of the eleven waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4).

Because waveforms φ2(1,1) and φ2(1,1) of waveform array Φ2 end at the same time interval (Time Interval 24) as the eleven waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4) of waveform array Φ1 that also end at Time Interval 24, each of waveforms φ2(1,1) and φ2(1,1) is deemed to be "frame aligned" with each of the eleven waveforms φ1(1,2), φ1(1,3), φ1(1,4), φ1(2,1), φ1(2,2), φ1(2,3), φ1(2,4), φ1(3,1), φ1(3,2), φ1(3,3), and φ1(3,4).

Figure 8B:
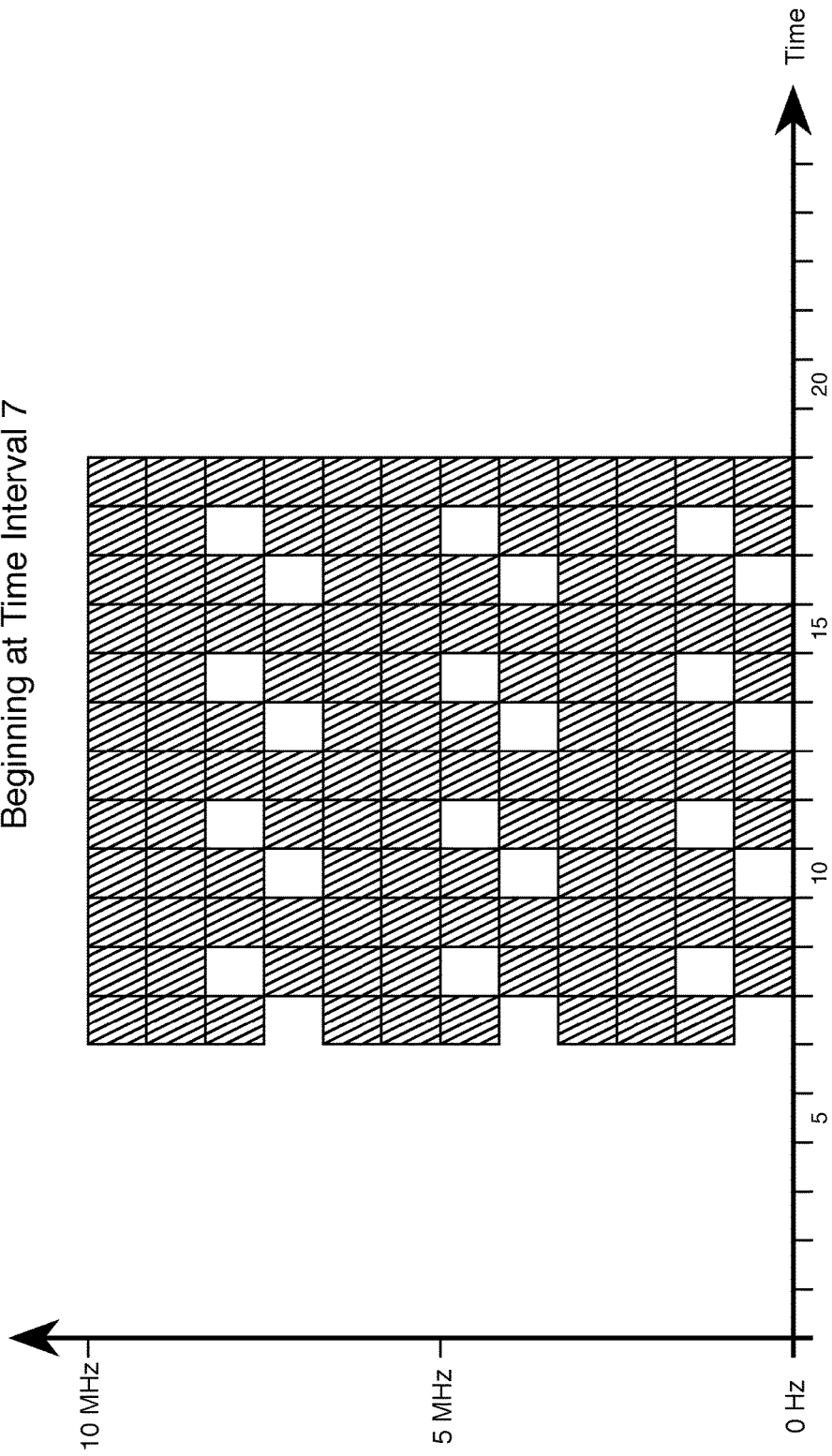
FIG. 8b depicts a plot of where the energy associated with waveforms φ1(1,2), φ1(1,3), φ1(1,4), φ1(2,1), Φ1(2,3), φ1(2,4), φ1(3,1), φ1(3,2), φ1(3,3), and φ1(3,4) of waveform array Φ1 (M1=3, N1=4) is deposited into the 10 MHz radio channel beginning at time interval 7 (i.e., depicted by the left-slanted diagonally-striped blocks).

FIGS. 8a, 8b, and 8c depict the interleaving of waveforms from waveform arrays Φ1 and Φ2 to convey 14 data items in 24 time intervals so that no two waveforms deposit energy into the time-frequency space of the modulated radio-frequency carrier signal. In this example, radio 101 has 14 data items to transmit to radio 102. Of the 14 data items, four are high-latency-tolerant data items and are stored in a high-latency queue (shown in Table 4) and 10 are low-latency tolerant data items and are stored in a low-latency queue (shown in Table 5).

TABLE 4

High-Latency Tolerant Data Item Queue

| Data Item | Conveying Waveform | Beginning Time Interval |
|---|---|---|
| 1 | φ2(1, 1) | 1 |
| 2 | φ2(1, 2) | 1 |
| 3 | φ2(2, 3) | 1 |
| 4 | φ2(2, 4) | 1 |

TABLE 5

Low-Latency Tolerant Data Item Queue

| Data Item | Conveying Waveform | Beginning Time Interval |
|---|---|---|
| 1 | φ1(1, 2) | 7 |
| 2 | φ1(1, 3) | 7 |
| 3 | φ1(1, 4) | 7 |
| 4 | φ1(2, 1) | 7 |
| 5 | φ1(2, 3) | 7 |
| 6 | φ1(2, 4) | 7 |
| 7 | φ1(3, 1) | 7 |
| 8 | φ1(3, 2) | 7 |
| 9 | φ1(3, 3) | 7 |
| 10 | φ1(3, 4) | 7 |

FIG. 8a depicts a plot of where the energy associated with waveforms φ2(1,1), φ2(1,1), φ2(2,3), and φ2(2,4) of waveform array Φ2 (M2=3, N2=8) is deposited into a 10 MHz radio channel beginning at time interval 1 (i.e., depicted by the right-slanted diagonally-striped blocks). Waveforms φ2(1,1), φ2(1,1), φ2(2,3), and φ2(2,4) convey high-latency tolerant data items 1, 2, 3, and 4 respectively.

FIG. 8b depicts a plot of where the energy associated with waveforms φ1(1,2), φ1(1,3), φ1(1,4), φ1(2,1), φ1(2,3), φ1(2,4), φ1(3,1), φ1(3,2), φ1(3,3), and φ1(3,4) of waveform array Φ1 (M1=3, N1=4) is deposited into the 10 MHz radio channel beginning at time interval 7 (i.e., depicted by the left-slanted diagonally-striped blocks). Waveforms φ1(1,2), φ1(1,3), φ1(1,4), φ1(2,1), φ1(2,3), φ1(2,4), φ1(3,1), φ1(3,2), φ1(3,3), and φ1(3,4) convey low-latency tolerant data items 1, 2, 3, 4, 5, 6, 7, 8, 9, 10, and 11, respectively.

FIG. 8c depicts FIGS. 8a and 8b superimposed, which illustrates the interleaving of 14 waveforms from waveform arrays Φ1 and Φ2 such that:

I. no two waveforms overlap the time-frequency space of the modulated radio-frequency carrier signal (to prevent inter-symbol interference), and III. waveforms from waveform array Φ1 convey data items with low-latency tolerance and waveforms from waveform array Φ2 convey data items with high-latency tolerance.

Because waveforms φ2(1,1), φ2(1,1), φ2(2,3), and φ2(2,4) of waveform array Φ2 neither begin at the same time interval (Time Interval 1) as the ten waveforms φ1(1,2), φ1(1,3), φ1(1,4), φ1(2,1), φ1(2,3), φ1(2,4), φ1(3,1), φ1(3,2), φ1(3,3), and φ1(3,4) of waveform array Φ1 that begin at Time Interval 7, nor end at the same time interval (Time Interval 24 versus Time Interval 18) each of waveforms φ2(1,1) and φ2(1,1) is deemed to be "frame unaligned" with each of the ten waveforms φ1(1,2), φ1(1,3), φ1(1,4), φ1(2,1), φ1(2,3), φ1(2,4), φ1(3,1), φ1(3,2), φ1(3,3), and φ1(3,4).

At task 202, radio 101 generates the complete set of waveforms of waveform array Φ1 and Φ2, in accordance with the parameters established in task 201.

At task 203, radio 101 receives data items for transmission to radio 102. As part of task 202, radio 101 establishes a one-to-one relationship between each data item and one waveform in either waveform array Φ1 or Φ2. In particular, the data item that corresponds to waveform φj(mj,nj) is designated dj(mj,nj). It will be clear to those skilled in the art, after reading this disclosure, how to make and use embodiments of the present invention that perform task 202.

As part of task 203, radio 101 modulates a radio-frequency carrier signal with the data items to generate a modulated radio-frequency carrier signal. In particular, the radio-frequency carrier signal is modulated by:

$$\Sigma \phi j(mj,nj) \cdot dj(mj,nj)$$

for all of the data items that were received in task 202. It will be clear to those skilled in the art, after reading this disclosure, how to make and use embodiments of the present invention that perform task 203.

At task 204, the modulated radio-frequency carrier signal is transmitted/radiated into the radio channel via an antenna for reception by radio 102.

At task 205, radio 102 receives the modulated radio-frequency carrier signal and demodulates it using matched filters, in well-known fashion, to recover the each of the data items that were transmitted by radio 101.

MARKMAN DEFINITIONS

Orthogonal—For the purpose of this specification, two waveforms are orthogonal if their inner product is zero over the time interval of interest.

Identical Waveform Arrays—For the purposes of this specification, waveform array $\Phi1(M1, N1)$ and waveform array $\Phi2(M2, N2)$ are identical if $M1=M2$ and $N1=N2$.

Non-identical Waveform Arrays—For the purposes of this specification, waveform array $\Phi1(M1, N1)$ and waveform array $\Phi2(M2, N2)$ are non-identical if they are not identical.

What is claimed is:

1. A process comprising:
   receiving a first data item and a second data item;
   generating a waveform $\phi1(m1,n1)$ of waveform array $\Phi1$ wherein:
   (i) the waveform $\phi1(m1,n1)$ is partitioned into N1 time slots 1, . . . , p1, . . . , N1, and
   (ii) time slot p1 of the waveform $\phi1(m1,n1)$ comprises a basic waveform b1(m1) multiplied by $\exp[2\pi(n1-1)(p1-1)i/N1]$, and
   (iii) the waveform $\phi1(m1,n1)$ is multiplied by the first data item, and
   (iv) M1 and N1 are positive integers greater than 1, and
   (v) m1 is a positive integer in the range $m1 \in \{1, \ldots, M1\}$, and
   (vi) n1 and p1 are positive integers in the range n1, $p1 \in \{1, \ldots, N1\}$;
   generating a waveform $\phi2(m2,n2)$ of waveform array $\Phi2$ wherein:
   (i) the waveform $\phi2(m2,n2)$ is partitioned into N2 time slots 1, . . . , p2, . . . , N2, and
   (ii) time slot p2 of the waveform $\phi2(m2,n2)$ comprises a basic waveform b2(m2) multiplied by $\exp[2\pi(n2-1)(p2-1)i/N2]$, and
   (iii) the waveform $\phi2(m2,n2)$ is multiplied by the second data item, and
   (iv) M2 and N2 are positive integers greater than 1, and
   (v) m2 is a positive integer in the range $m2 \in \{1, \ldots, M2\}$, and
   (vi) n2 and p2 are positive integers in the range n2, $p2 \in \{1, \ldots, N2\}$;
   modulating a radio-frequency carrier signal with the sum of the waveform $\phi1(m1,n1)$ and the waveform $\phi2(m2,n2)$ to generate a modulated radio-frequency carrier signal; and
   radiating the modulated radio-frequency carrier signal into a radio channel via an antenna;
   wherein $M1 \neq M2$; and
   wherein the waveform $\phi1(m1,n1)$ and the waveform $\phi2(m2,n2)$ overlap in time in the modulated radio-frequency carrier signal.

2. The process of claim 1 wherein M2 is an integral multiple of M1 and M1<M2.

3. The process of claim 1 wherein $N1 \neq N2$.

4. The process of claim 1 wherein N2 is an integral multiple of N1 and N1<N2.

5. The process of claim 1 wherein waveform $\phi1(m1,n1)$ is frame aligned with waveform $\phi2(m2,n2)$ in the modulated radio-frequency carrier signal.

6. The process of claim 1 wherein waveform $\phi1(m1,n1)$ is frame unaligned with waveform $\phi2(m2,n2)$ in the modulated radio-frequency carrier signal.

7. The process of claim 1 wherein the waveform $\phi1(m1,n1)$ and the waveform $\phi2(m2,n2)$ do not overlap in the time-frequency space of the modulated radio-frequency carrier signal.

8. The process of claim 1 wherein the bandwidth of the radio channel is B Hz, and the duration of the basic waveform b1(m1) is M1/B seconds.

9. The process of claim 1 wherein the bandwidth of the radio channel is B Hz, wherein the duration of the waveform $\phi1(m1,n1)$ is M1·N1/B seconds, and wherein the duration of the waveform $\phi2(m2,n2)$ is M2·N2/B seconds.

10. The process of claim 1 wherein the first data item is less latency tolerant than the second data item.

11. A process comprising:
    receiving a first data item and a second data item;
    generating a waveform $\phi1(m1,n1)$ of waveform array $\Phi1$ wherein:
    (i) the waveform $\phi1(m1,n1)$ is partitioned into N1 time slots 1, . . . , p1, . . . , N1, and
    (ii) time slot p1 of the waveform $\phi1(m1,n1)$ comprises a basic waveform b1(m1) multiplied by $\exp[2\pi(n1-1)(p1-1)i/N1]$, and
    (iii) the waveform $\phi1(m1,n1)$ is multiplied by the first data item, and
    (iv) M1 and N1 are positive integers greater than 1, and
    (v) m1 is a positive integer in the range $m1 \in \{1, \ldots, M1\}$, and
    (vi) n1 and p1 are positive integers in the range n1, $p1 \in \{1, \ldots, N1\}$;
    generating a waveform $\phi2(m2,n2)$ of waveform array $\Phi2$ wherein:
    (i) the waveform $\phi2(m2,n2)$ is partitioned into N2 time slots 1, . . . , p2, . . . , N2, and
    (ii) time slot p2 of the waveform $\phi2(m2,n2)$ comprises a basic waveform b2(m2) multiplied by $\exp[2\pi(n2-1)(p2-1)i/N2]$, and
    (iii) the waveform $\phi2(m2,n2)$ is multiplied by the second data item, and
    (iv) M2 and N2 are positive integers greater than 1, and
    (v) m2 is a positive integer in the range $m2 \in \{1, \ldots, M2\}$, and
    (vi) n2 and p2 are positive integers in the range n2, $p2 \in \{1, \ldots, N2\}$;
    modulating a radio-frequency carrier signal with the sum of the waveform $\phi1(m1,n1)$ and the waveform $\phi2(m2,n2)$ to generate a modulated radio-frequency carrier signal; and
    radiating the modulated radio-frequency carrier signal into a radio channel via an antenna;
    wherein $N1 \neq N2$; and
    wherein the waveform $\phi1(m1,n1)$ and the waveform $\phi2(m2,n2)$ overlap in time in the modulated radio-frequency carrier signal.

12. The process of claim 11 wherein M2 is an integral multiple of M1 and M1<M2.

13. The process of claim 11 wherein M1≠M2.

14. The process of claim 11 wherein N2 is an integral multiple of N1 and N1<N2.

15. The process of claim 1 wherein waveform $\phi1(m1,n1)$ is frame aligned with waveform $\phi2(m2,n2)$ in the modulated radio-frequency carrier signal.

16. The process of claim 11 wherein waveform $\phi1(m1,n1)$ is frame unaligned with waveform $\phi2(m2,n2)$ in the modulated radio-frequency carrier signal.

17. The process of claim 11 wherein the waveform $\phi1(m1,n1)$ and the waveform $\phi2(m2,n2)$ do not overlap in the time-frequency space of the modulated radio-frequency carrier signal.

18. The process of claim 11 wherein the bandwidth of the radio channel is B Hz, and the duration of the basic waveform b1(m1) is M1/B seconds.

19. The process of claim 11 wherein the bandwidth of the radio channel is B Hz, wherein the duration of the waveform $\phi1(m1,n1)$ is M1·N1/B seconds, and wherein the duration of the waveform $\phi2(m2,n2)$ is M2·N2/B seconds.

20. The process of claim 11 wherein the first data item is less latency tolerant than the second data item.

\* \* \* \* \*